US 10,383,779 B2

(12) United States Patent
Koch

(10) Patent No.: US 10,383,779 B2
(45) Date of Patent: Aug. 20, 2019

(54) OPERATING TABLE COLUMN FOR AN OPERATING TABLE

(71) Applicant: Maquet GmbH, Rastatt (DE)

(72) Inventor: Guido Koch, Karlsruhe (DE)

(73) Assignee: MAQUET GMBH, Rastatt (DE)

( * ) Notice: Subject to any disclaimer, the term of this patent is extended or adjusted under 35 U.S.C. 154(b) by 28 days.

(21) Appl. No.: 14/790,128

(22) Filed: Jul. 2, 2015

(65) Prior Publication Data

US 2016/0000620 A1 Jan. 7, 2016

(30) Foreign Application Priority Data

Jul. 4, 2014 (DE) .................. 10 2014 109 375

(51) Int. Cl.
*A47B 7/00* (2006.01)
*A61G 7/012* (2006.01)
(Continued)

(52) U.S. Cl.
CPC .............. *A61G 7/012* (2013.01); *A61G 7/005* (2013.01); *A61G 7/008* (2013.01); *A61G 13/04* (2013.01);
(Continued)

(58) Field of Classification Search
CPC ........ A61G 7/012; A61G 7/005; A61G 7/008; A61G 13/04; A61G 13/06; A61G 13/08;
(Continued)

(56) References Cited

U.S. PATENT DOCUMENTS 2,059,130 A * 10/1936 May .................. A61G 15/02
248/161
2,532,677 A * 12/1950 Shampaine ........... A61G 13/02
16/34
(Continued)

FOREIGN PATENT DOCUMENTS

CN 1392788 A 1/2003
CN 201147445 Y 11/2008
(Continued)

OTHER PUBLICATIONS

Merriam-Webster's Collegiate Dictionary 10th edition, copyright 2001.*

(Continued)

*Primary Examiner* — Nicholas F Polito
*Assistant Examiner* — Morgan J McClure

(57) ABSTRACT

The invention relates to an operating table column (10) for an operating table (100), said operating table column comprising a basic body (12) and a column head (14) to which a patient support (103) may be connected. Further, the operating table column (10) comprises a first linear actuator (20) and a second linear actuator (22) which are independently adjustable for changing the position of the column head (14) relative to the basic body (12). The first linear actuator (20) and the second linear actuator (22) each are oriented and arranged so as to perform an actuating motion in vertical direction when activated. The first linear actuator (20) is mechanically connected to the column head (14) via a first connecting area (30), and the second linear actuator (22) is mechanically connected to the column head (14) via a second connecting area (32). The column head (14) comprises a length adjustment assembly (36, 50) through which the distance between the first connecting area (30) and the second connecting area (32) is changeable during an (Continued)

actuating motion of the first linear actuator (20) and/or the second linear actuator (22).

21 Claims, 8 Drawing Sheets

(51) Int. Cl.

| | | |
|---|---|---|
| *A61G 13/04* | (2006.01) | |
| *A61G 13/06* | (2006.01) | |
| *A61G 7/005* | (2006.01) | |
| *A61G 7/008* | (2006.01) | |
| *H04L 29/08* | (2006.01) | |
| *A47D 13/08* | (2006.01) | |
| *A47D 15/00* | (2006.01) | |
| *A61G 13/08* | (2006.01) | |

(52) U.S. Cl.
CPC .............. *A61G 13/06* (2013.01); *A47D 13/08* (2013.01); *A47D 15/008* (2013.01); *A61G 13/08* (2013.01); *H04L 67/306* (2013.01)

(58) Field of Classification Search
CPC .......... A47D 9/02; A47D 9/00; A47D 15/008; A47D 13/08; A47D 13/10; A47D 13/102; A47D 13/105; A47D 13/107; G08B 21/0227; G08B 21/028; G08B 21/0294; H04L 67/306
See application file for complete search history.

(56) References Cited

U.S. PATENT DOCUMENTS

| | | | | |
|---|---|---|---|---|
| 2,897,029 A * | 7/1959 | Maisel | ............... | A61G 13/10 5/607 |
| 3,042,131 A * | 7/1962 | Dovci | ............... | A61G 5/023 180/41 |
| 3,393,004 A * | 7/1968 | Williams | ............ | A61G 7/005 296/20 |
| 3,579,671 A * | 5/1971 | Kötter | ............... | A61G 7/005 5/610 |
| 3,739,406 A * | 6/1973 | Koetter | .............. | A61G 7/005 5/149 |
| 3,900,906 A * | 8/1975 | Berthelsen | ........... | A61G 7/002 5/608 |
| 4,572,493 A | 2/1986 | Hubert | | |
| 4,667,354 A * | 5/1987 | Carey, Jr. | ........... | A61G 1/0212 248/654 |
| 4,865,303 A * | 9/1989 | Hall | ................. | A61G 13/04 5/614 |
| 4,912,787 A * | 4/1990 | Bradcovich | ........ | A61B 6/0442 296/20 |
| 4,958,817 A * | 9/1990 | Heller | ............... | A61G 13/04 5/607 |
| 5,074,000 A * | 12/1991 | Soltani | .............. | A61G 7/05746 254/9 C |
| 5,181,288 A * | 1/1993 | Heaton | .............. | A61G 7/008 5/607 |
| 5,299,334 A * | 4/1994 | Gonzalez | ............ | A61G 7/005 5/607 |
| 5,345,632 A * | 9/1994 | Langenaeken | ...... | A61B 6/0457 108/4 |
| 5,477,570 A * | 12/1995 | Hannant | ............ | A61G 7/1046 5/600 |
| 5,528,782 A * | 6/1996 | Pfeuffer | .............. | A61G 13/04 108/147 |
| 5,621,933 A * | 4/1997 | Knapp | ................ | A61G 7/018 5/607 |
| 5,624,375 A * | 4/1997 | Dykes | ................ | A61G 7/005 108/7 |
| 5,791,233 A * | 8/1998 | Knapp | ................ | A61G 7/002 92/161 |
| 6,640,363 B1 * | 11/2003 | Pattee | ................ | A61G 13/04 5/601 |
| 6,678,907 B1 * | 1/2004 | Voelker | .............. | A61G 7/012 5/11 |
| 7,257,850 B1 * | 8/2007 | Tekulve | .............. | A47C 20/041 5/428 |
| 7,913,337 B1 * | 3/2011 | Masson | .............. | A61G 7/16 5/503.1 |
| 8,657,243 B2 * | 2/2014 | Marugg | .............. | A61G 13/104 248/188.8 |
| 8,677,529 B2 * | 3/2014 | Jackson | .............. | A61G 13/08 5/600 |
| 9,295,598 B2 * | 3/2016 | Roussy | .............. | A61G 7/015 |
| 2003/0074735 A1 * | 4/2003 | Zachrisson | ........... | A61G 13/04 5/607 |
| 2005/0015878 A1 * | 1/2005 | Bannister | .............. | A61G 13/02 5/618 |
| 2010/0211099 A1 * | 8/2010 | Radermacher | ....... | A61G 13/009 606/245 |
| 2010/0275371 A1 * | 11/2010 | Turner | ................ | A61G 7/1044 5/83.1 |
| 2011/0010858 A1 * | 1/2011 | Tesar | ................... | A61G 7/005 5/608 |
| 2016/0000627 A1 * | 1/2016 | Jackson | ............... | A61G 13/02 5/608 |
| 2016/0000628 A1 * | 1/2016 | Koch | .................. | A61G 13/04 5/611 |
| 2016/0089287 A1 * | 3/2016 | Buerstner | .............. | A61G 13/08 5/616 |
| 2016/0095773 A1 * | 4/2016 | Ruch | ................... | A61G 7/018 5/616 |

FOREIGN PATENT DOCUMENTS

| | | | | |
|---|---|---|---|---|
| CN | 102631271 A | 8/2012 | | |
| CN | 103596538 A | 2/2014 | | |
| CN | 103767847 A | 5/2014 | | |
| DE | 1798342 U | 10/1959 | | |
| DE | 1 928 624 | 12/1965 | | |
| DE | 43 41 779 A1 | 6/1995 | | |
| DE | 44 23 402 A1 | 1/1996 | | |
| DE | 196 23 580 C2 | 12/1997 | | |
| DE | 19623580 | * 12/1997 | ............ | A61G 13/02 |
| DE | 10 2010 020 129 A1 | 11/2011 | | |
| DE | 10 2010 051 126 A1 | 5/2012 | | |
| DE | 10 2011 000 628 A1 | 8/2012 | | |
| DE | 10 2011 103 546 A1 | 12/2012 | | |
| GB | 1559945 A | 1/1980 | | |
| JP | H08-182711 A | 7/1996 | | |
| JP | H09-124277 A | 5/1997 | | |
| JP | 2003-527921 A | 9/2003 | | |
| JP | 2004-511289 A | 4/2004 | | |
| JP | 2005-144174 A | 6/2005 | | |
| JP | 2014-039593 A | 3/2014 | | |
| JP | 5518960 B2 | 6/2014 | | |

OTHER PUBLICATIONS

Extended European Search Report dated Nov. 4, 2015 issued for related EP Patent Application No. 15171193.4, 6 pages.
Extended European Search Report dated Nov. 4, 2015 issued for corresponding EP Patent Application No. 15171179.3, 7 pages.
Extended European Search Report dated Nov. 4, 2015 issued for related EP Patent Application No. 15171217.1, 7 pages.
Japanese Office Action dated Jul. 12, 2016 which issued during the prosecution of corresponding Japanese Patent Application No. 2015-127480, 5 pages.
Chinese Office Action and Chinese Search Report (including English translation) dated Oct. 9, 2016 which issued during the prosecution of corresponding Chinese Patent Application No. 201510378762. X, 8 pages.
English translation of Chinese Office Action and Chinese Search Report dated Aug. 22, 2016 which issued during the prosecution of corresponding Chinese Patent Application No. 201510387488.2, 9 pages.

(56) References Cited

OTHER PUBLICATIONS

Operator Manual, Cmax™ Surgical Table, dated Mar. 16, 2009, 60 pages.
STERIS 4085 General Surgical Table, Information Guide, dated Jul. 1, 2009, 8 pages.
NHS Purchasing and Supply Agency, Buyers' guide, Operating tables, dated Aug. 2009, 93 pages.

* cited by examiner

OPERATING TABLE COLUMN FOR AN OPERATING TABLE

CROSS REFERENCE TO RELATED APPLICATIONS

Applicant hereby claims foreign priority benefits under U.S.C. § 119 from German Patent Application No. DE 10 2014 109 375.5 filed on Jul. 4, 2014, the contents of which are incorporated by reference herein.

TECHNICAL FIELD

The invention relates to an operating table column having a basic body and a column head to which a patient support is attachable. The invention further relates to an operating table having an operating table column of this type.

BACKGROUND

Prior to and during an operation of a patient placed on the patient support, the patient support is brought to a position which facilitates a surgical intervention on the patient. In order to do so, pivoting of the patient support by large angles may be required. Also the height of the operating table's patient support should be adjustable within a range as wide as possible. The operating table ideally further allows for very small heights of the patient support, which requires compact construction of the operating table column.

The following three different types of operating tables are typically used in hospitals: stationary operating tables, movable operating and mobile operating tables. Stationary operating tables have an operating table column permanently fixed to the floor of an operating room and normally do not comprise an operating table base, and energy is supplied to them via fixedly installed cables. With these stationary operating tables, the patient support can easily be detached and re-attached and is transportable by means of a dedicated transport apparatus. With this transport apparatus, a patient resting on the patient support can be transported to and away from the operating room.

Movable operating tables have an operating table base connected to the operating table column an allowing for free positioning in the operating room, and a patient support which can be detached from and re-attached to the operating table column. Moving of the operating table column is performed by means of a column transporter provided therefore, or, in the case of self-mobile movable operating tables, by means of incorporated extractable transport rollers.

Operating table bases of mobile operating tables include rollers for moving the operating table such that they can be moved without auxiliary means and are suited for transporting a patient. Further, with mobile operating tables, the patient support usually is fixedly coupled to the operating table column and is not separated from the operating table column in hospital practice. Mobile operating tables may further employ electric traction drives, in particular including soft start and safety brake function, in order to move the mobile operating table by means of the electric traction drive.

Energy supply of movable operating tables and mobile operating tables can be accomplished via accumulator batteries which are preferably integrated in the operating table, and in particular are arranged in the operating table column base or in the operating table column.

Stationary operating tables as well as movable operating tables or mobile operating tables may employ components which can be adjusted by means of an electric motor, such as an operating table column which is length adjustable by means of an electric motor for height variation of a patient support attached to the operating table column, an operating table column head which is adjustable about two orthogonal axes for variation of tilt and swing of the patient support connected to the operating table column head, and/or components of the patient support that can be adjusted by means of an electric motor.

Herein, tilt means pivoting the patient support about a rotational axis which is orthogonal to a vertical plane in which the patient support's longitudinal axis extends. Swing refers to pivoting the patient support about the longitudinal axis thereof, or about a rotational axis parallel to the patient support's longitudinal axis and extending in a vertical plane including the patient support's longitudinal axis. In case there is no patient support connected to the column head of the operating table column, the definitions of tilt and swing relate to adjustments of the column head as would occur with a patient support attached.

From document DE 10 2011 000 628 A1 an operating table column is known comprising three actuators for adjusting swing and tilt. The mechanical construction thereof is rather complicated and requires much construction space. Rigidity and freedom from play of the tilt function are adversely influenced by the rotatable tilt cylinder. The kinematic coupling between the swing and tilt functions leads to interference of these functions.

From document DE 196 23 580 C2 a lifting column is known comprising three vertical lifting cylinders for adjusting a patient support.

SUMMARY

In view of the prior art known, it is the object of the invention to specify an operating table column which allows for large ranges of adjustment of tilt, swing, and/or height of the column head of the operating table column, employing a simple construction.

This object is achieved by an operating table column including a basic body and including a column head to which a patient support is connectable, wherein the operating table column comprises a first linear actuator and a second linear actuator which are independently adjustable for changing the position of the column head relative to the basic body, the first linear actuator and the second linear actuator each are oriented and arranged so as to perform an actuating motion in vertical direction upon activation thereof, the first linear actuator is mechanically connected to the column head via a first connecting area and the second linear actuator is mechanically connected to the column head via a second connecting area, the column head comprises a length adjustment assembly through which the distance between the first connecting area and the second connecting area is changeable during an actuating motion of the first linear actuator and/or the second linear actuator, and the first linear actuator and the second linear actuator are the only force transmitting elements between the column head and the basic body.

By means of an operating table column, the column head, or a patient support connected thereto, can be tilted via different actuations, or the swing thereof can be varied. In addition, with a simultaneous actuating motion of the linear actuators in the same direction of adjustment, the column head can be varied in height, i.e. can be lifted or lowered, respectively, without changing the swing or tilt.

No further mechanical connection for force transmission is provided between column head and basic body, besides the two linear actuators. In addition to the thus simplified construction of the operating table column, this bears the advantage that only a simple covering of the column basic body is required, having two apertures for the two linear actuators. Further, one aperture for a connection for energy and signal transmission is required to be formed in the column basic body covering. Bellows which are required for covering the column basic body in most of the prior art operating tables can be omitted. Due to the fact that the first and/or the second linear actuator transfer any torque acting about a connecting line between the first connecting area and the second connecting area preferably to the basic body of the operating table column, in particular the tilting torques occurring with swing of the patient support can be securely held. It is particularly advantageous if the two linear actuators are permanently mechanically fixed to the basic body. This further simplifies the construction. Further, high stability is achieved at low production costs. With this formation, lifting of the column head can be simply accomplished by simultaneously extending the first and second linear actuators.

Further, it is advantageous if the linear actuators each perform an exclusively vertical actuating motion, i.e. an adjusting motion parallel to the perpendicular longitudinal axis of the operating table column. This is in particular achieved by the first and second linear actuators being oriented and arranged such that the longitudinal axes thereof are parallel during any actuating motions thereof. Therein, the actuating motions preferably extend along the respective longitudinal axes of the first and second linear actuators. Preferably, the length adjustment assembly connects the first connecting area of the first linear actuator with the second connecting area of the second linear actuator. The length adjustment assembly is preferably formed such that an adjustment of the distance between the first connecting area and the second connecting area due to a different actuating motion of the first and second linear actuators is performed passively. The terms swing and tilt have already been explained in the introduction to the description, and are used throughout the description and in the claims according to that explanation.

The first and second linear actuators may, for example, be realized as a hydraulic cylinder or as a lead screw drive driven by an electric motor.

Further, it is advantageous if both linear actuators are connected to a height adjustable part of the basic body. In this case, the total range of height adjustment is the sum of the height adjustment of the basic body and the height adjustment caused by the linear actuators. An additional actuator, preferably a hydraulic cylinder or a lead screw drive driven by an electric motor, is provided for height adjustment of the height adjustable part of the basic body. A lead screw drive is a drive comprising a lead screw and converting a rotary motion into a translatory motion. This allows for a relatively large height adjustment range.

Furthermore, it is advantageous if the column head includes a pivoting unit for pivoting, in the connected state, a patient support which is connected to or is connectable to the column head. The pivoting unit can be pivoted about at least a first rotational axis and about a second rotational axis. The first rotational axis and the second rotational axis are perpendicular to each other when projected onto a horizontal plane. Likewise, the longitudinal axis of the patient support and the first rotational axis are perpendicular to each other when projected onto a horizontal plane. Thereby it is possible to pivot the patient support about two principal axes such that swing and tilt of the patient support can be adjusted in a simple manner.

It is particularly advantageous if the longitudinal axis of the first linear actuator and the longitudinal axis of the second linear actuator are spaced in the direction of the longitudinal axis of the patient support, and preferably are spaced by a distance within the range of 10 cm to 50 cm. In the case of patient supports where a natural definition of a longitudinal axis is impossible, the longitudinal axis of the patient support is determined as a line parallel to the center axis of a patient resting thereon in a centered position according to normal use. Preferably, the center of gravity of the patient support is located on the longitudinal axis thereof. Thus, there are no or only small torques for a rotation about the longitudinal axis of the patient support acting on the mechanical elements of the operating table column.

Further, it is advantageous to mechanically couple the column head via a first pivot bearing in the first connecting area with the upper end of the first linear actuator so as to be pivotable about a first rotational axis, and to mechanically couple the column head via a second pivot bearing in the second connecting area with the upper end of the second linear actuator so as to be pivotable about a second rotational axis. Herein, the first and second rotational axes are parallel. This allows for pivoting of the column head about a rotational axis which is parallel to the rotational axes of the first and second pivot bearings, or which, depending on how the linear actuators are controlled, corresponds to one of said rotational axes, wherein the length adjustment assembly compensates for the change in distance between the first pivot bearing and the second bearing. Thus, the first and second pivot bearings are preferably each located at the interface of first and second linear actuator and column head. The end of the first linear actuator facing the column head is referred to as the upper end of the first linear actuator. The end of the second linear actuator facing the column head is referred to as the upper end of the second linear actuator. This development allows for realizing the pivoting of the column head relative to the linear actuators that occurs upon tilt adjustment by means of robust mechanical pivot elements having a simple structure.

It is also particularly advantageous if the length adjustment assembly comprises a rod and an element having a orifice where one end of the rod can be inserted in and extracted from in order to change the distance between the first connecting area and the second connecting area upon an actuating motion of the first linear actuator and/or the second linear actuator. A patient support attachable to the column head is thereby pivotable about the rod's longitudinal axis. The element having a hole can be a bearing eye which is slidable on the rod wherein the bearing eye in particular surrounds or encloses the rod. In a particularly preferred embodiment, the rod system is not continuously formed between the two pivot bearings.

In a particularly advantageous development of the invention, the column head has at least one support element which is fixedly connected to the part of the first bearing that is rotatable with respect to the first linear actuator, and which is pivotable about the first rotational axis so as to be pivoted about the first pivot bearing together with the head. The support element has at least one third connecting area for connecting the support element to a first end of a third linear actuator. Preferably, a second end of the third linear actuator opposite to the first end is operatively connected to the pivoting unit of the column head.

The second end of the third linear actuator is preferably pivotable about an axis connecting the upper end of the first linear actuator and the upper end of the second linear actuator, or about an axis parallel to said axis. Upon extending or retracting the third linear actuator, and a swivel adjustment resulting therefrom, the second end of the third linear actuator moves on a circular path about the axis connecting the upper end of the first linear actuator and the upper end of the second linear actuator, or an axis parallel to said axis.

By means of the development described above, both, tilt and swivel of a patient support connected to the column head can be adjusted easily and accurately. What is particularly regarded as an operative connection in this context, is the fact that a movement of the second end of the third linear actuator causes a related movement of the pivoting unit.

As an alternative, or in addition, the support element may be pivotable about the first rotational axis of the first pivot bearing or about the second rotational axis of the second pivot bearing.

Preferably, also the first end of the third linear actuator is pivotably connected with the third connecting area such that during an actuating motion of the third linear actuator, the longitudinal axis of the third linear actuator always lies in one plane, without simultaneous tilt adjustment of the column head. Therein, the third linear actuator is pivoted about a rotational axis which, when projected onto a horizontal plane, is orthogonal to the projection onto that plane of the rotation axis of the support element.

As alternative to the pivotable connection between the first end of the third linear actuator and the support element, a second length adjustment assembly may be provided between support element and column head.

The arrangement consisting of two vertical linear actuators for tilt and at least one linear actuator for swivel as described above allows in an advantageous manner for swiveling the column head without having to feed the driving means required therefore through the covering of the column basic body. Therefore, a complex covering, such as bellows, is not required, thus enabling easy cleaning of the operating table column. Further, the swivel function is decoupled from the tilt function. Correct tilt and swivel angle adjustment by the operator is thus possible in easy manner, and complex controlling and monitoring efforts can be avoided.

It is particularly advantageous if the support element comprises a forth connecting area for connecting a first end of a fourth linear actuator, wherein the first end of the fourth linear actuator is operatively connected to the fourth connecting area, and a second end of the fourth linear actuator opposite to the first end of the fourth linear actuator is operatively connected to the pivoting unit.

Preferably, the third connecting area of the support element and the first end of the third linear actuator are connected via a third pivot bearing. Further, the fourth connecting area of the support element and the first end of the fourth linear actuator are connected via a fourth pivot bearing. The rotational axes of the third and fourth pivot bearings are parallel.

By means of this arrangement, an adjustment of the swivel of the column head at two points of action is made possible. Further, the third and fourth linear actuators can be single-acting hydraulic cylinders, thus allowing for a compact arrangement. Further, the third and second linear actuators have to meet lower stability requirements than in the case where only one actuator is provided.

Alternatively, it is advantageous if the column head includes a second support element which is fixedly connected to the part of the second pivot bearing that is rotatable with respect to the second linear actuator such that it is pivoted about the second pivot bearing together with the head. The second support element includes a fourth connecting area for connecting a first end of the fourth linear actuator. Thus, the first end of the third linear actuator is connected to the support element, and the first end of the fourth linear actuator is connected to the second support element. Thereby, in case of high torque acting on the column head, parts of the torque are induced into both, the first linear actuator and the second linear actuator. Thus, additional stabilization of the column head and relief of the pivot bearing, as well as less load acting on the first and second linear actuators is achieved.

It is particularly advantageous if the longitudinal axis of the first linear actuator and the longitudinal axis of the second linear actuator extend in a vertical plane, and if the third connecting area for connection with the lower first end of the third linear actuators is arranged on a first side at a first distance to said vertical plane, and the fourth connecting area for connection with the lower first end of the fourth linear actuator is arranged on a second side opposite to the first side at a second distance to said vertical plane. The first distance and the second distance are preferably equal. In this embodiment, it is advantageously possibly to form the third and/or fourth linear actuators as single-acting cylinders, and to thereby adjust the swivel of a patient support in a simple manner.

It is further particularly advantageous if the third linear actuator and/or the fourth linear actuator are formed as single-acting cylinders, preferably as plunger cylinders. Thereby, a simple and cost-efficient structure is possible.

Further, it as advantageous if the first linear actuator, the second actuator and/or the third actuator are formed as double-acting cylinders. In case of patients who are positioned such that their center of gravity no longer lies in the region between the first and second linear actuators, one of these cylinders is tensioned. Correspondingly, in case of patients which are positioned in transverse direction and whose center of gravity lies outside the region between the third and fourth linear actuator, one of these cylinders is tensioned. Thanks to the realization as double-acting cylinders, even the tensile forces acting in that case can be held by the corresponding cylinder.

It is particularly advantageous if the operating table column is part of an operating table, and if a patient support can be attached to the column head. Further, it is advantageous if the operating table is realized as a stationary, a movable or a mobile operating table. By realizing of the operating table column as part of a full set, the typical requirements of a surgeon are met while stability of the total system is guaranteed.

BRIEF DESCRIPTION OF THE DRAWINGS

Further features and advantages of the invention result from the following description which in connection with the enclosed Figures explains the invention in more detail with reference to embodiments.

DETAILED DESCRIPTION

Figure 1:
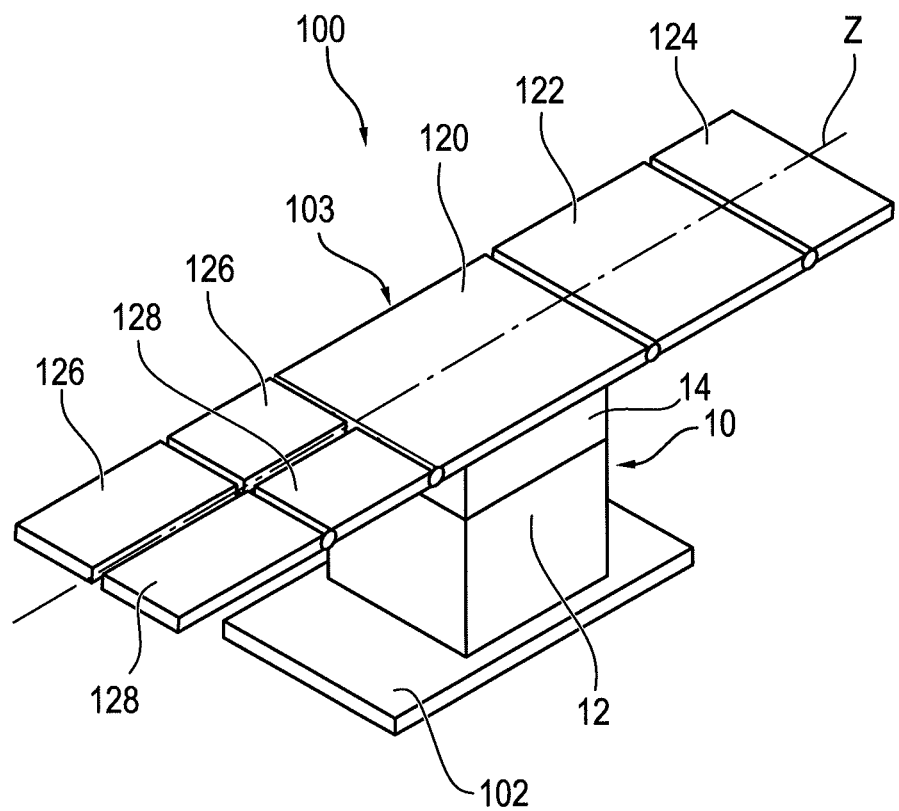
FIG. 1 shows a schematic illustration of an operating table comprising an operating table column according to a first embodiment of the invention.

FIG. 1 is a schematic illustration of an operating table 100 according to a first embodiment of the invention, comprising a base 102, an operating table column 10, and a patient support 103.

The patient support 103 includes a plurality of components whose position relative to one another can be adjusted to allow for different positioning of patient not shown. In the present embodiment, the patient support 103 includes a seat panel 120, a back panel 122, a head panel 124, a two-piece right leg panel 126, and a two-piece left leg panel 128. The longitudinal axis of the patient support is indicated by a dashed line and designated by reference sign Z.

Figure 2:
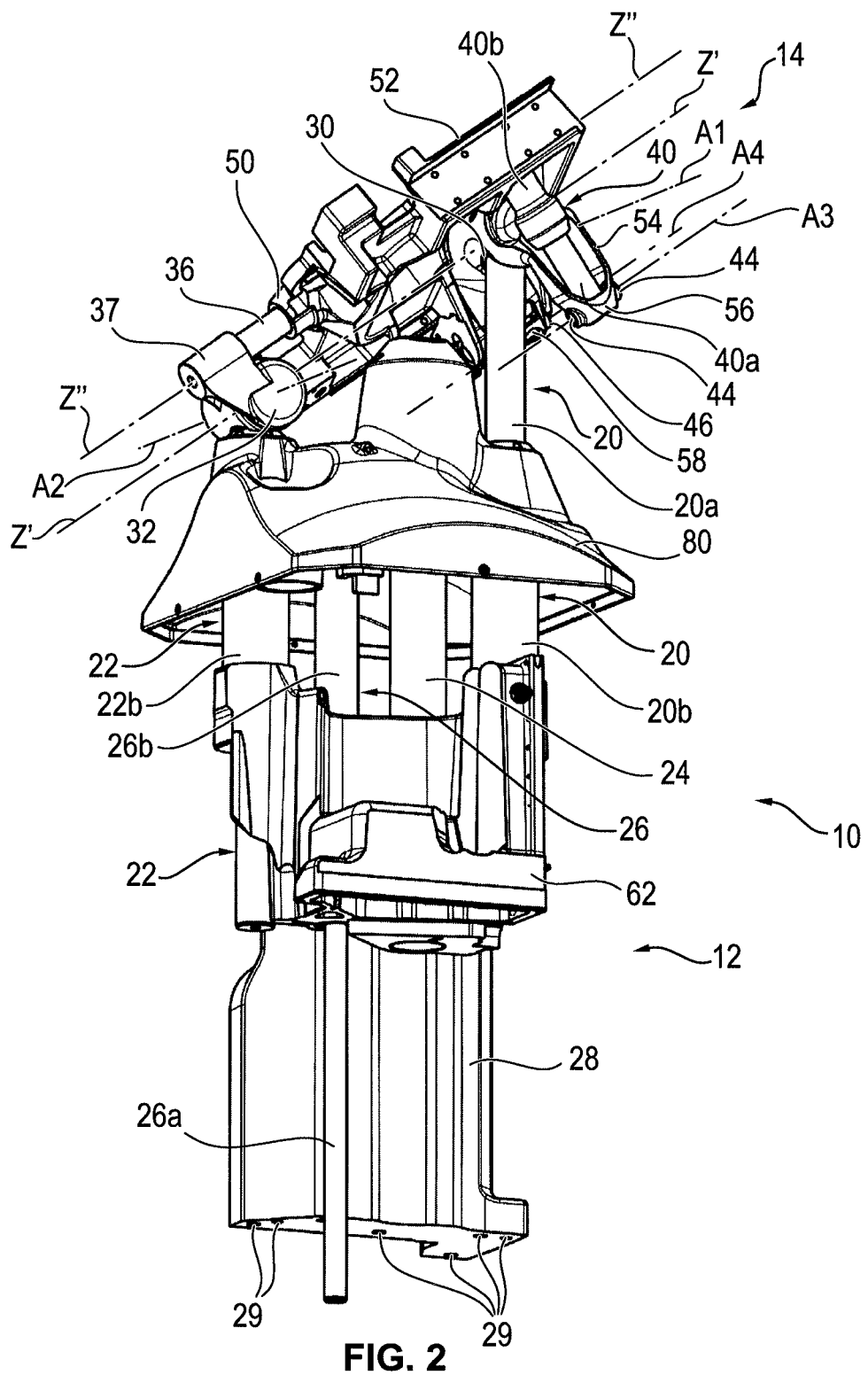
FIG. 2 shows a detailed view of the operating table column according to FIG. 1 including a basic body and a column head which has been pivoted for tilt adjustment about a horizontal axis extending orthogonally with respect to the longitudinal axis of patient support not shown, and pivoted for swing adjustment about an parallel axis with respect to the longitudinal axis of the patient support not shown.

FIG. 2 is a detailed illustration of the operating table column 10 without the outer covering elements visible in FIG. 1. Elements having the same structure or same function are designated by identical reference numbers. The operating column 10 includes a basic body 12 and the column head 14 which has been pivoted for tilt adjustment about a horizontal axis extending orthogonally to the longitudinal axis of a patient support 103 not shown. Moreover, the column head 14 has been pivoted for swing adjustment about the rotational axis Z".

The basic body 12 is fixedly connected to the base 102 via a flange 29 provided on the lower side of the basic body 12. The column head 14 is connected to drive and support elements of the seat panel 120 and the back panel 22 of the patient support 103, either fixedly or so as to be slidable in longitudinal direction. In other embodiments, the column head 14 may be connected to the patient support 103 for coupling and de-coupling.

A lifting carriage which is movable in vertical direction by means of a lifting cylinder 26 is provided for a first step of height adjustment. The lifting carriage comprises a lower part 62 and an upper part 80. In other embodiments, another type of linear actuator may be provided instead of the lifting carriage, in particular a lead screw drive. A double-acting hydraulic cylinder with a vertically extending longitudinal axis is employed as the lifting cylinder 26. When pressurized correspondingly, the piston rod 26a of the hydraulic cylinder 26 is pushed out of and into, respectively, the cylinder barrel 26b of the hydraulic cylinder. Therein, the lower part of the piston rod 26a is fixedly connected to the base 102 of the operating table 100, preferably by means of a threaded connection. The lower end of the cylinder barrel 26b is fixedly connected to the lower part 62 of the lifting carriage, and the upper part of the cylinder barrel 26b is fixedly connected to the upper part 80 of the lifting carriage. A movement of the piston rod 26a relative to the cylinder barrel 26b causes a vertical movement of the cylinder barrel 26b together with the lifting carriage. The lifting carriage includes a guide bar 25 which fixedly couples the upper part 80 of the lifting carriage and the lower part 62 of the lifting carriage. The vertical movement of the lifting carriage is guided by the lifting cylinder 26 and the guide bar 24. For this purpose, the guide bar 24 is fed through a guide bush (not shown in FIG. 2) provided in the basic body 12. The longitudinal axes of the cylinder barrel 26b and of the guide bar 24 are vertical, and thus parallel. By means of the arrangement of the lifting cylinder 26 and the guide bar 24 as well as the lifting carriage, the lifting carriage may be lowered as deep as into the region of the base 102 of the operating table 100, i.e. even below the basic body 12. In FIG. 2, the lifting carriage is shown in an upper end position.

A lower first end of a cylinder barrel 20b of a first linear actuator 20 realized as hydraulic cylinder is fixedly connected to the lower part 62 of the lifting carriage. A lower first end of a cylinder barrel 22b of a second linear actuator 22 realized as a hydraulic cylinder is fixedly connected at a distance to the first end of the cylinder barrel 20b. An upper second end of the cylinder barrel 20b is fixedly connected to the upper part 80 of the lifting carriage. An upper second end of the cylinder barrel 22b is fixedly connected at a distance to the second end of the cylinder barrel 20b. Here, the upper and lower ends of the cylinder barrels 20b, 22b are fixedly clamped in the lifting carriage such that the position of the longitudinal axes of the linear actuators 20, 22 relative to the lifting carriage cannot be changed. The longitudinal axes of the linear actuators 20, 22 are vertically arranged at a mutual distance. The lower ends of the cylinder barrels 20b, 22b are on the same horizontal plane. The upper end of a piston rod 20a of the first linear actuator 20 is connected to the column head 14 in a first connecting area via a first pivot bearing 30, and the upper end of a piston rod 22a of the second linear actuator 22 is connected to the column head 14 in a second connecting area via a second pivot bearing 32. The first pivot bearing 30 defines a rotational axis A1, and the second pivot bearing 32 defines a rotational axis A2, with the rotational axes A1, A2 being horizontal and parallel. The rotational axes A1, A2 are orthogonal to a longitudinal axis Z' which is parallel to the longitudinal axis Z of the patient support 103. By means of the linear actuators 20, 22 tilt of the patient support 103 as well as height of the column head 14 can be changed, alternatively or additionally to the lifting carriage.

The column head 14 comprises a pivoting and sliding pin 36 which is pivotable about the rotational axis A2 relative to the second linear actuator 22 by means of the second pivot bearing 32, wherein a first end of the pivoting and sliding pin 36 is fixedly connected to the second pivot bearing 32 via a retaining bush 37. The column head 14 includes a pivoting unit 52 having a bearing bush 50 through which the second end of the pivoting and sliding pin 36 opposite the first end is fed, wherein the bearing bush 50 is free to move on the pivoting and sliding pin 36 in direction of the longitudinal axis thereof, i.e. in axial direction. Further, the bearing bush 50 is free to rotate about the pivoting and sliding pin 36. By means of this arrangement, the pivoting unit 52 is rotatable about a rotational axis Z" with respect to the pivot bearings 30, 32 and the linear actuators 20, 22.

The pivoting unit 52 serves for connecting the column head 14 with the patient support 103 and for pivoting the patient support 103 when it is connected to the pivoting unit 52. The pivoting unit 52 is connected to the first pivot bearing 30 so as to be pivotable with respect to the first linear actuator 30 about the rotational axis A1 of the first pivot bearing, and to be axially fixed. The pivoting and sliding pin 36 and the bearing bush 50 form a slide bearing which allows for both, rotation of the pivoting unit 52 about the pivoting and sliding pin 36 for swivel adjustment of the patient support 103 and length adjustment in case of non-parallel extension of the first linear actuator 20 and the second linear actuator 33, such that pivoting and sliding pin 36 and bearing bush 50 are parts of a length adjustment assembly between the upper end of the first linear actuator 20 and the upper end of the second linear actuator 22, said parts being movable with respect to one another. The first pivot bearing 30 and the second pivot bearing 32 are thus connected to one another via the pivoting and sliding pin 36 and the bearing bush 50.

For tilt adjustment of the pivoting unit 52, the first linear actuator 20 has been extended, and the second linear actuator 22 has been kept in the retracted position. Doing so, the pivoting unit 52 was moved on the pivoting and sliding pin 36, together with the bearing bush 50 such that the pivoting unit 52 has moved away from the second pivot bearing 32.

A support element 54 is fixedly connected to the first pivot bearing 30 so as to be pivoted about the rotational axis A1 together with the column head 14. The support element 54 is formed such that the lower end of the first arm has a third connecting area 56 ad the lower and of the second arm has a fourth connecting area 58. The first arm of the support element 54 extends from the first pivot support 30 obliquely downward away from the vertical plane. The second arm of the support element 54 extends from the first pivot support 30 obliquely downward to the opposite side away from the vertical plane.

The third connecting area 56 is located at a distance to the first side of a vertical plane including the longitudinal axes of the first linear actuator 20 and the second linear actuator 22, and preferably the longitudinal axis Z', and the fourth connecting area 58 is located at a distance to the second side of the above plane, with the distances having the same amount.

The third connecting area 56 and the lower end of the third linear actuator 40 form a third pivot bearing 44. The fourth connecting area 58 and the lower end of the fourth linear actuator, not shown in FIG. 2, form a fourth pivot bearing 46.

The third linear actuator 40 is pivotable about a rotational axis A3 by means of the third pivot bearing 44. The second upper end of the third linear actuator 40 that is formed by the upper end of the cylinder barrel 40b is connected to the pivoting unit 52 via a further pivot bearing so as to be pivotable about a rotational axis parallel to the third rotational axis A3 such that the pivoting unit 52 is pivoted about the rotational axis Z" when the third linear actuator 40 is activated. In this first embodiment, the third linear actuator 40 is formed as a single-acting hydraulic cylinder which is arranged such that upon pressurization, the piston rod 40a is actively pushed out of the cylinder barrel 40b. Thus, the pivoting unit 52 is rotated in a first direction about the rotational axis Z" when the third linear actuator 40 is pressurized.

By means of the fourth pivot bearing 46, the fourth linear actuator is pivotable about a fourth rotational axis A4 which is parallel to the rotational axis A3 and to the vertical plane. The second upper end of the fourth linear actuator that is formed by the upper end of the cylinder barrel is connected to the pivoting unit 52 via a further pivot bearing so as to be pivotable about a rotational axis parallel to the fourth rotational axis A4 such that the pivoting unit 52 is pivoted about the rotational axis Z" when the fourth linear actuator is activated. In the first embodiment, the fourth linear actuator, too, is formed as a single-acting hydraulic cylinder arranged such that upon pressurization, the piston rod thereof is actively pushed out of the cylinder barrel. Thereby, the pivoting unit 52 is rotted in a second direction, opposite the first direction, about the rotational axis Z" when the fourth linear actuator is pressurized. For swing adjustment, the third linear actuator 40 was extended, and the fourth linear actuator was compressed such that the pivoting unit 52 was rotated about the rotational axis Z" in a direction away from the observer.

Figure 3:
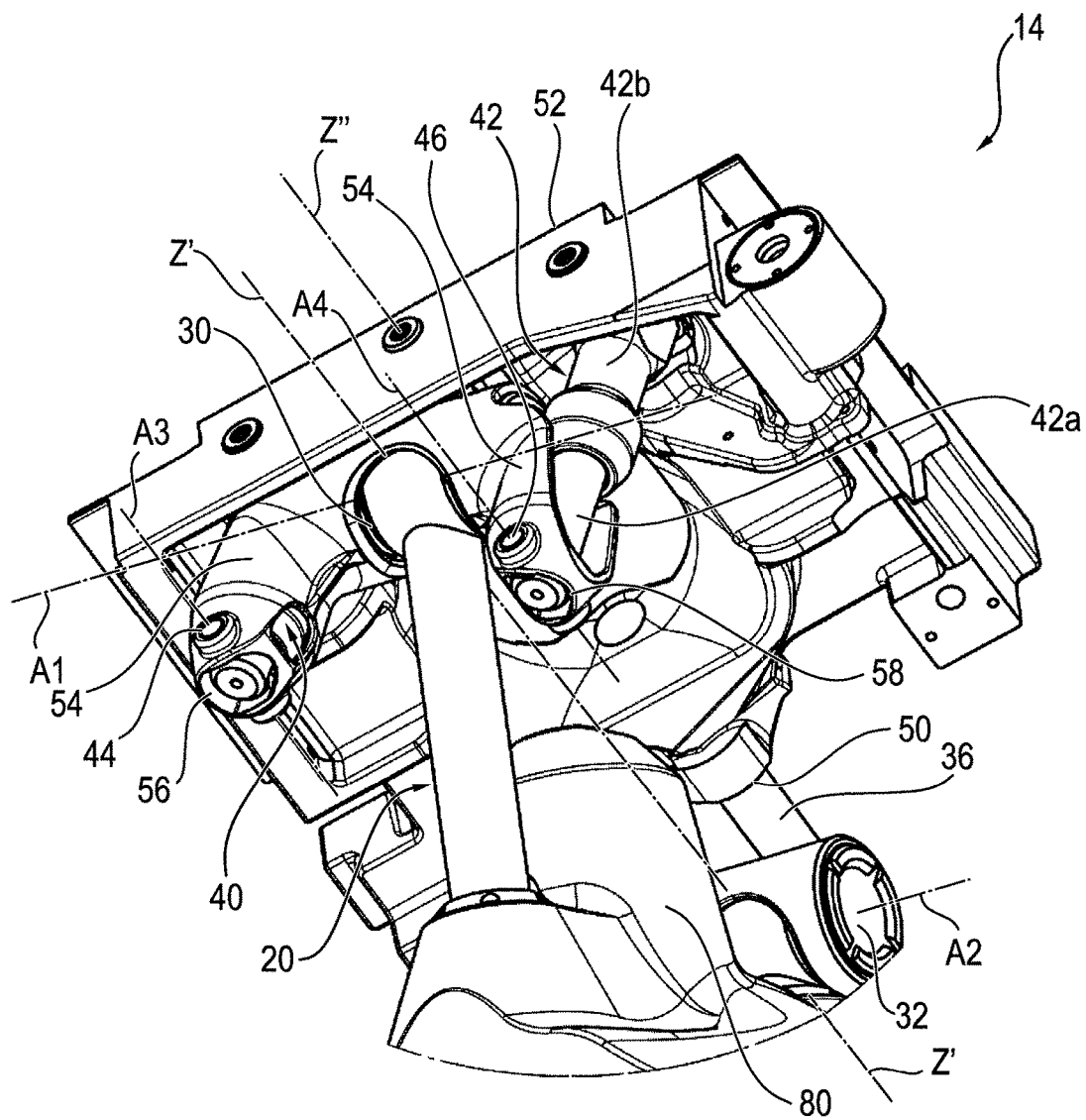
FIG. 3 is a detailed view of a part of the operating table column according to FIG. 2 including the column head comprising a support element with a third and a fourth connecting area, wherein the column head has been pivoted about an axis parallel to the longitudinal axis of the patient support with respect to the neutral position shown in FIG. 1.

FIG. 3 shows a detailed view of the column head 14 shown in FIG. 2 from another point of view. The pivoting unit 52 is tilted like in FIG. 2 as compared to a horizontal neutral position where at least the resting surface of the seat panel 120 connected to the pivoting unit 52 is positioned horizontally, i.e. is neither tilted nor swung. For this purpose, starting from the neutral position, the first linear actuator 20 has been extended, and the second linear actuator 22 has been kept in its lower end position. Moreover, the pivoting unit 52 has been pivoted from the swing end position shown in FIG. 2 to the opposite end position, i.e. counter-clockwise from the perspective shown in FIG. 3. For this purpose, the fourth linear actuator 42 has been extended, and the third linear actuator 40 has been compressed to the retracted position. To this aim, corresponding hydraulic valves are opened when the fourth linear actuator 42 is extended in order to discharge hydraulic fluid from the third linear actuator 40.

By means of subsequent extension of the third linear actuator 40, the pivoting unit 52 is pivoted from the position shown in FIG. 3 in counter-clockwise direction about the rotational axis Z", wherein the fourth linear actuator 42 is compressed. To this aim, corresponding hydraulic valves are opened when the third linear actuator 40 is extended, such that hydraulic fluid may be discharged from the fourth linear actuator 42. Thereby, swivel of the patient support 103 can be adjusted easily and independent on the tilt adjustment. Further, the piston rod of the fourth linear actuator 42 is designated by reference sign 42a, and the cylinder barrel of the fourth linear actuator 42 is designated by reference sing 42b.

Further, the connection of the first linear actuator 20 to the pivoting unit 52 and the support element 54 via the first pivot bearing 30 is clearly visible in FIG. 3. By means of extending the first linear actuator 20, the pivoting unit 52 has been tilted, together with the support element 54, about a rotational axis perpendicular to the rotational axis Z', or about a rotational axis parallel to the rotational axis Z'.

Figure 4:
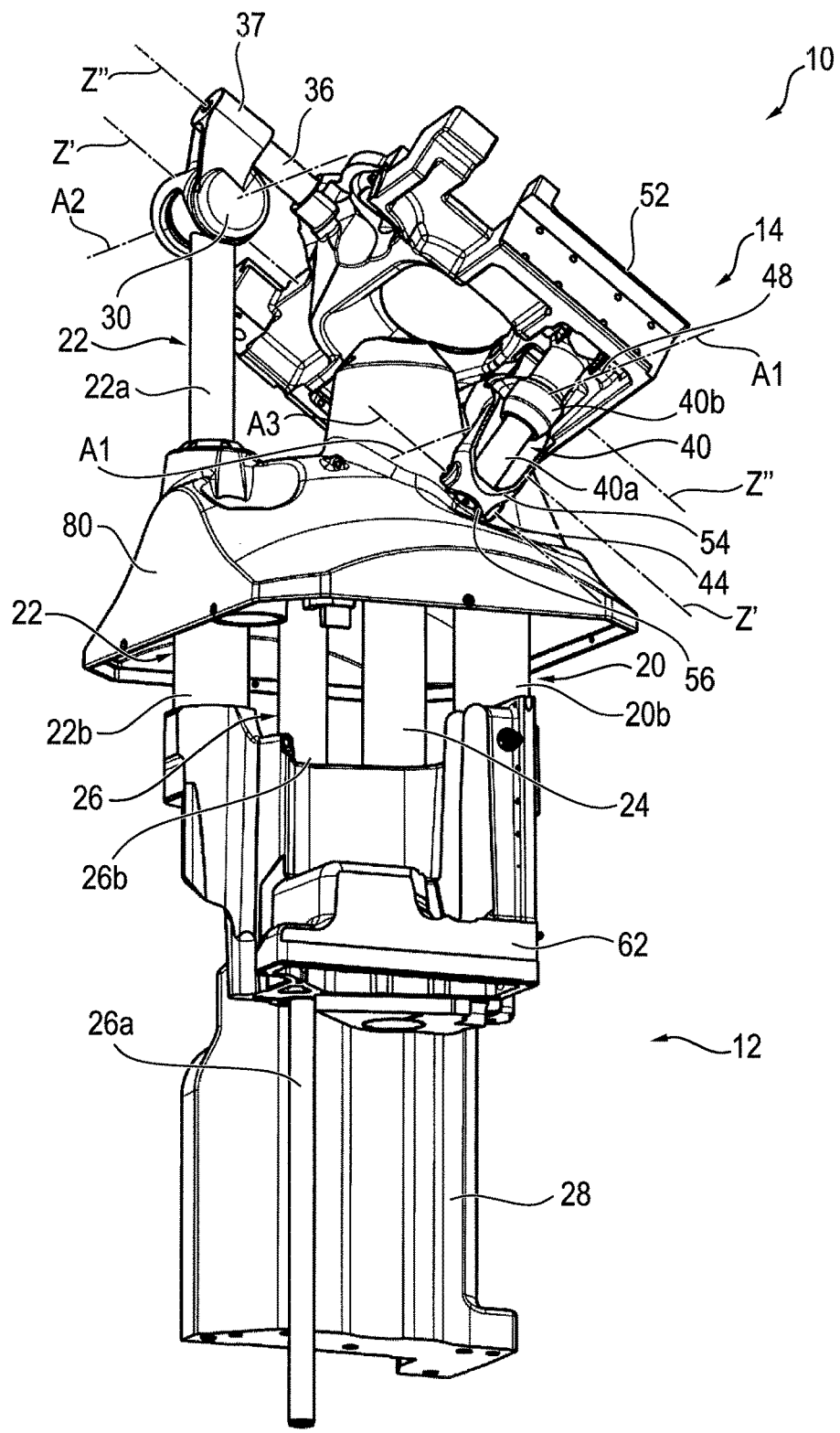
FIG. 4 is a detailed view of the operating table column according to FIGS. 2 and 3, wherein the column has been tilted in the opposite rotating direction with respect to FIG. 2.

FIG. 4 shows a detailed illustration of the operating table column 10 according to FIGS. 2 and 3 wherein the column head 14 has been tilted in the opposite direction with respect to FIG. 2.

In this FIG. 4, the second linear actuator 22 of the operating table column 10 has been extended farther as compared to FIGS. 2 and 3. The first linear actuator 20 is retracted. Thereby, the pivoting unit 52 is tilted in a direction different from that shown in FIGS. 2 and 3.

Further, the pivot bearing 48 which pivotably connects the upper end of the third linear actuator 40 to the pivoting unit 52 is clearly visible in FIG. 4. Therein, the rotational axis of the pivot bearing 48 is parallel to the longitudinal axis Z' and to the rotational axis A3.

Figure 5:
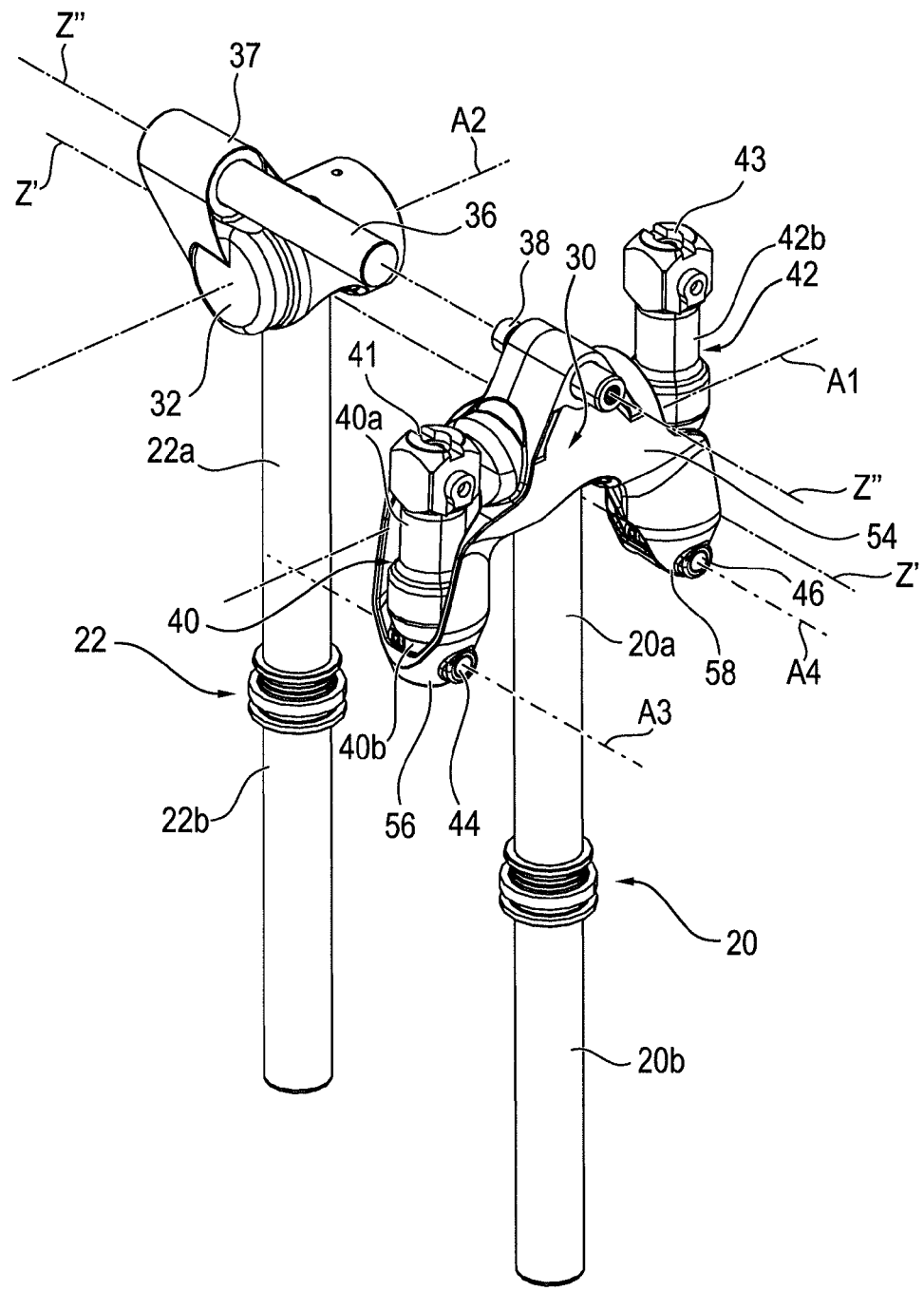
FIG. 5 shows linear actuators of the operating table column according to FIGS. 2 to 4, for tilt and swivel adjustment.

FIG. 5 shows linear actuators 20, 22, 40, 42 of the operating table column 10 according to FIGS. 2 and 4 for tilt and swing adjustment. These are the main elements which enable height adjustment, tilt and swing of the patient support 103 of the operating table 100. What is shown is the first linear actuator 20 which is connected to the pivoting unit 52, not shown in FIG. 5, via the first pivot bearing 30 and a pin 38. Further visible are the upper ends of the third linear actuator 40 and the fourth linear actuator 42 which are connected to the pivoting unit 52 not shown. The second linear actuator 22 is connected to the pivoting and sliding pin 36 via the second pivot bearing 32 and the retaining bush 37.

The pivoting and sliding pin 36 and the pin 38 are oriented along the longitudinal axis Z" and allow for rotation of the pivoting unit 52, not shown, about said longitudinal axis Z" for adjustment of swing of the patient support 103.

At the lower end of the third connecting are 56, there is provided a pin which is held on both sides in the third connecting area 56 and whose longitudinal axis is parallel to the longitudinal axis Z'. The pin allows for pivoting the third linear actuator 40 about the rotational axis A3. Together with the third connecting area 56 and the lower end of the third linear actuator 40, the pin forms the third pivot bearing 44.

At the upper end of the third linear actuator 40 there is provided a first pin seat 41 adapted to accommodate a pin for connection of the upper end of the third linear actuator 40 and the pivoting unit 52, and which thus enables pivoting of the third linear actuator 40 relative to the pivoting unit 52 about an axis parallel to the longitudinal axis Z'.

At the lower end of the fourth connecting area 58 there is provided a pin which is held on both sides in the fourth connecting area 58 and whose longitudinal axis is parallel to the longitudinal axis Z'. The pin allows for pivoting of the fourth linear actuator 42 about the rotational axis A4. Together with the fourth connecting area 58 and the lower end of the fourth linear actuator 42, the pin forms the fourth pivot bearing 46.

At the upper end of the fourth linear actuator 42 there is provided a second pin seat 43 which is adapted to accommodate a pin for connecting the upper end of the fourth linear actuator 42 and the pivoting unit 52, and which thus enables pivoting of the fourth linear actuator 42 relative to the pivoting unit 52 about an axis parallel to the longitudinal axis Z'.

In contrast to FIG. 4, the fourth linear actuator 42 has been extended in FIG. 5, whereas the third linear actuator 40 has been retracted.

Figure 6:
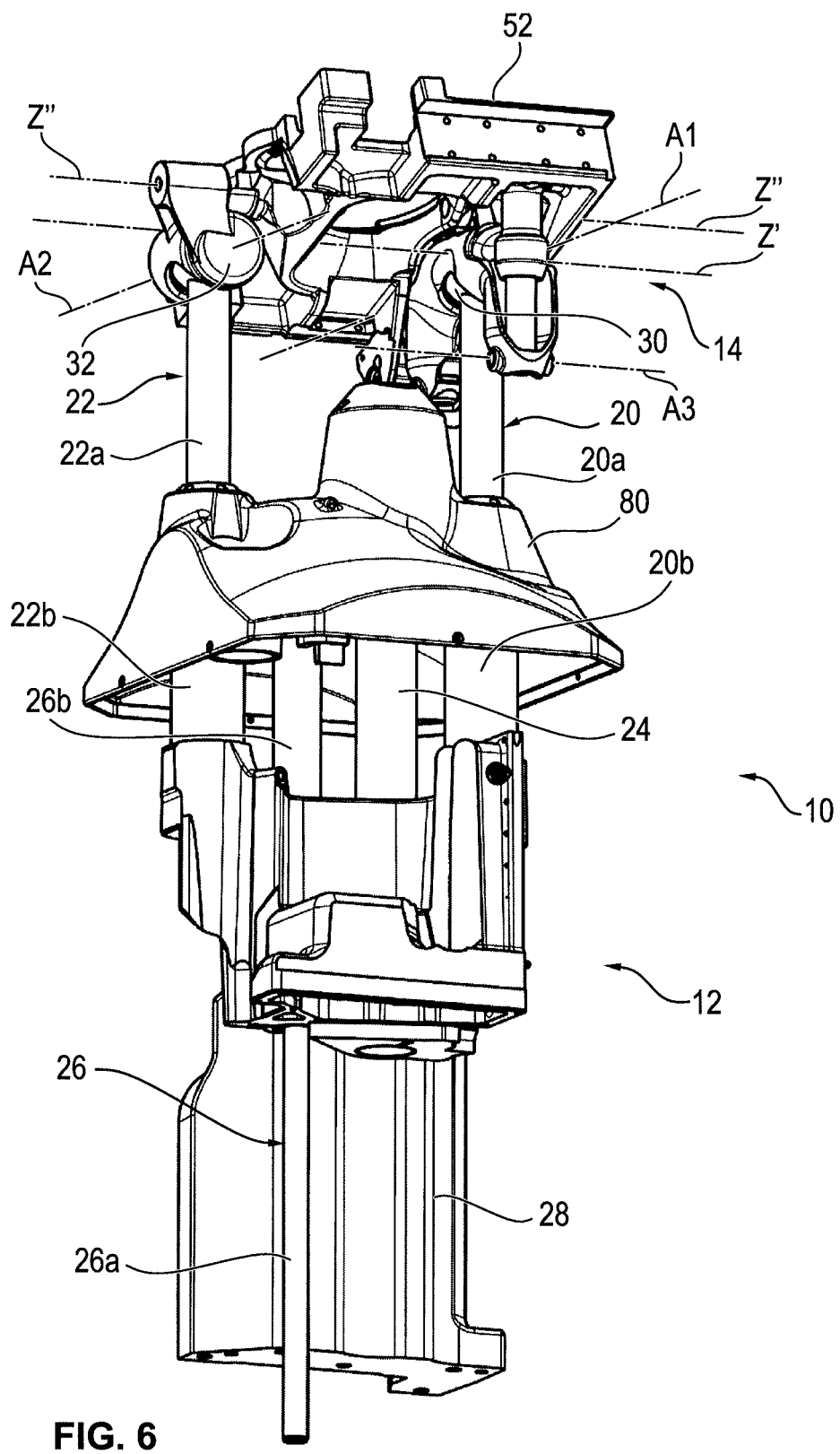
FIG. 6 shows the operating table column according to FIGS. 2 to 5, wherein height adjustment has been performed by simultaneous activation of the linear actuators serving for tilt adjustment.

FIG. 6 shows the operating table column 10 according to FIGS. 2 to 5 wherein height adjustment has been performed by simultaneously activating the linear actuators 20 and 22 serving for tilt adjustment. Further, the third linear actuator 40 is extended and the fourth linear actuator 42 is retracted, whereby corresponding swing of the patient support 103 connected to the pivoting unit 52 is achieved.

Figure 7:
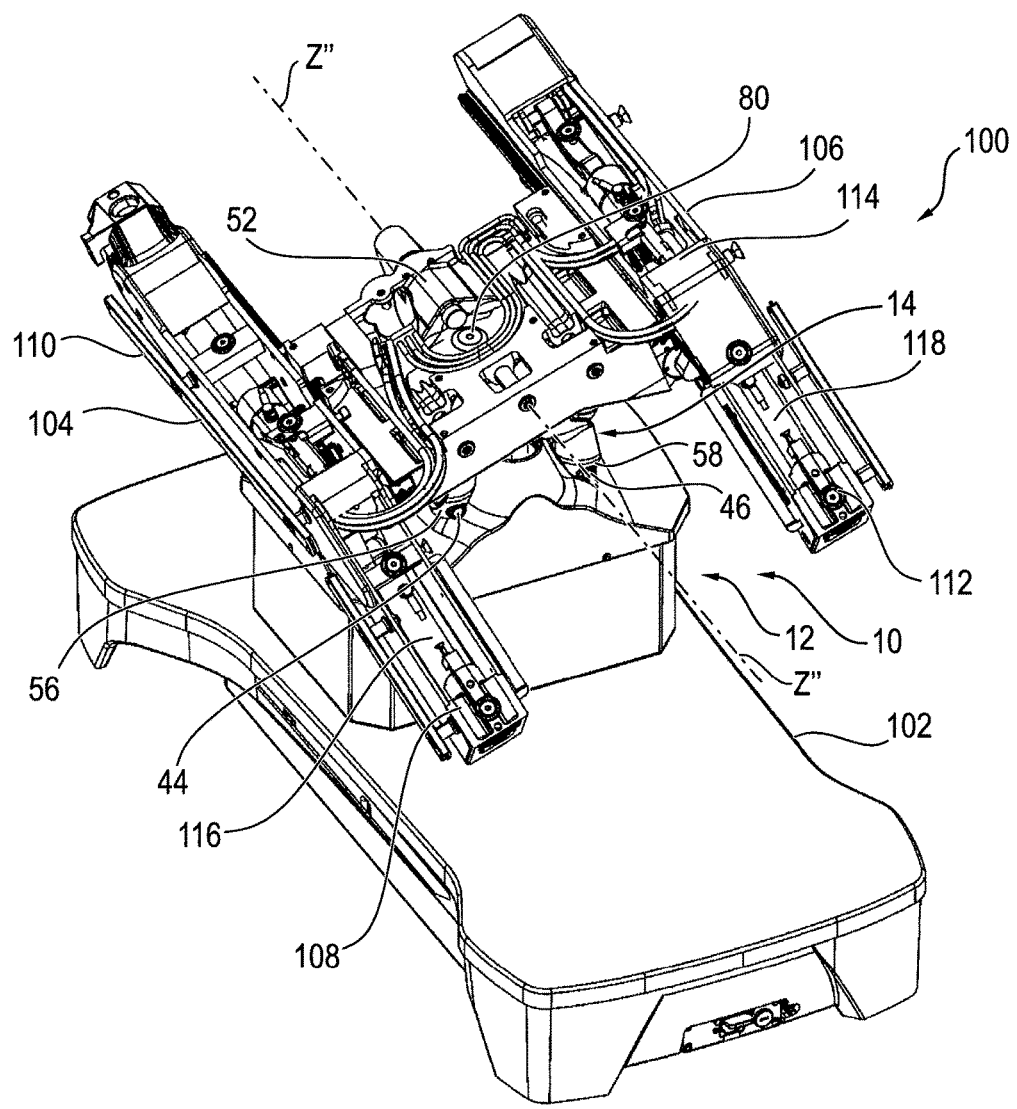
FIG. 7 is a detailed view of the operating table according to FIGS. 1 to 6 without padding and add-on elements.

FIG. 7 is a detailed illustration of the operating table 100 according to FIGS. 1 to 6 without padding and add-on elements wherein the outer covering elements of the operating table 10 and the base 102 are illustrated. Further, the third connecting area 56 and the fourth connecting area 58 of the support element 54, as well as the third pivot bearing 44 and the fourth pivot bearing 46 are visible.

A first patient support arm 104 and a second patient support arm 106 are connected to the pivoting unit 52 on two opposite sides. The first patient support arm 104 includes a first segment 108 for supporting the back panel 122 and a second segment 110 for supporting the seat panel 120 of the patient support 103. Likewise, the second patient support arm 106 includes a first segment 112 for supporting the back panel 122 and a second segment 114 for supporting the seat panel 120 of the patient support 103.

Via the patient support arms 104 and 106, the back panel 122 and the seat panel 122 are arranged so as to be pivotable with respect to one another about a rotational axis orthogonal to the longitudinal axis Z of the patient support 103. For this purpose, a first pivot cylinder 116 is arranged in the first segment 108 of the first patient support arm 104 so as to be capable of pivoting the second segment 110 of the first patient support arm 104 relative to the first segment 108. Further, a second pivot cylinder 118 is arranged in the first segment 112 of the second patient support arm 106 so as to be capable of pivoting the second segment 114 of the second patient support arm 106 relative to the first segment 112. Further, the patient support 103 is arranged so as to be slidable along the longitudinal axis Z thereof with respect to the operating table column 10.

Figure 8:
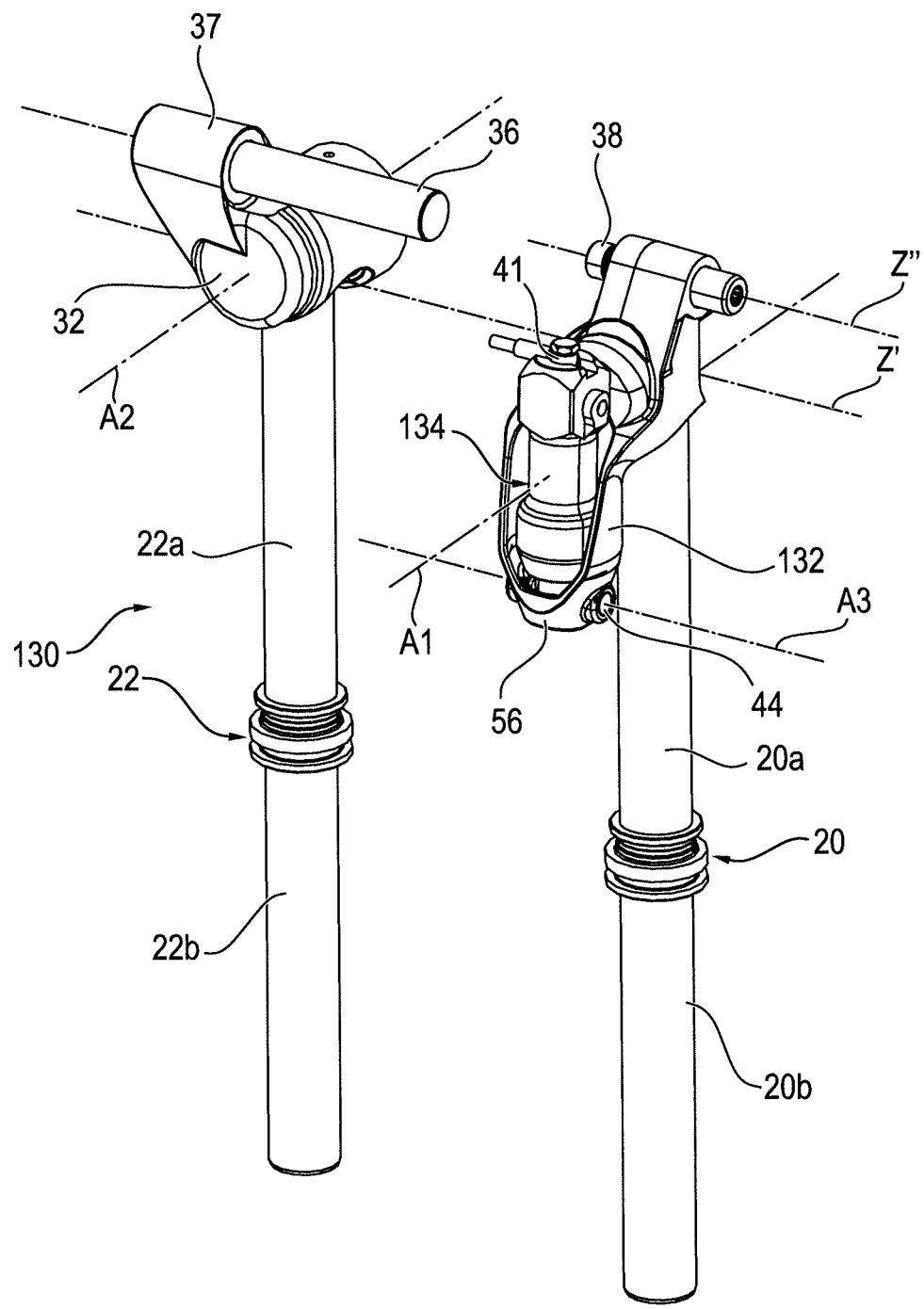
FIG. 8 shows linear actuators of an operating table column according to a second embodiment, wherein, in contrast to the first embodiment, only one linear actuator is provided for swivel adjustment.

In FIG. 8, linear actuators 20, 22, 134 of an operating table column 130 are shown, according to a second embodiment which, in contrast to the operating table column 10 of the first embodiment, includes a support element 132 comprising only one arm instead of the support element 54. Otherwise, the structure, function and coupling of the support element 132 correspond to structure, function and coupling of the support element 54. Further, instead of the third and fourth linear actuators 40, 42 only one linear actuator 134 is provided which is formed as a double-acting cylinder and whose lower end is connected to the arm of the support element 132 like the third linear actuator 40, and whose upper end is connected to the pivoting unit 52.

Structure and function of the remaining elements of the operating table column 130 correspond to the operating table column 10 of the first embodiment.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

The invention claimed is:

1. An operating table column, comprising:
    a basic body;
    a column head to which a patient support is connectable; and
    a first linear actuator and a second linear actuator which are independently adjustable for changing a position of the column head relative to the basic body;
    wherein the first linear actuator and the second linear actuator each are configured so as to perform an actuating motion in a vertical direction upon activation thereof;
    wherein the first linear actuator is mechanically connected to the column head via a first connecting area and the second linear actuator is mechanically connected to the column head via a second connecting area;

wherein the column head includes a length adjustment assembly through which a distance between the first connecting area and the second connecting area is changeable during the actuating motion of the first linear actuator or the second linear actuator;

wherein the first linear actuator and the second linear actuator are force transmitting elements attaching the column head to the basic body;

wherein the length adjustment assembly includes a bearing member and a pivoting and sliding member, the pivoting and sliding member being pivotably coupled to the second linear actuator at one end of the pivoting and sliding member;

wherein the bearing member is both rotatable about the pivoting and sliding member and also movable along a longitudinal direction of the pivoting and sliding member;

wherein a first support element is pivotably linked to the first linear actuator; and wherein at least a third linear actuator is linked to and carried by the first support element, the third linear actuator being pivotably connected to the first support element at a first end of the third linear actuator, and operatively connected to a patient support interface of the column head at a second end of the third linear actuator.

2. The operating table column according to claim 1, wherein at least one of the first linear actuator and the second linear actuator transmits a torque acting about a line connecting the first connecting area and the second connecting area.

3. The operating table column according to claim 2, wherein the column head includes a pivoting unit for pivoting the patient support which is connectable to the pivoting unit, wherein the pivoting unit is pivotable about at least a first rotational axis and a second rotational axis, wherein the first rotational axis and the second rotational axis are perpendicular to one another when projected onto a horizontal plane, and wherein the longitudinal axis of the patient support and the first rotational axis are perpendicular to one another when projected onto a horizontal plane.

4. The operating table column according to claim 2, wherein a longitudinal axis of the first linear actuator and a longitudinal axis of the second linear actuator are spaced in a direction of a longitudinal axis of the patient support.

5. The operating table column according to claim 1, wherein a lower end of the first linear actuator and a lower end of the second linear actuator are mechanically connected to a height adjustable part of the basic body, the height adjustable part of the basic body being configured to raise and lower the column head independent of actuation of the first linear actuator and second linear actuator;

wherein said first support element is pivotably linked to an upper end of the first linear actuator.

6. The operating table column according to claim 1, wherein the column head includes a pivoting unit for pivoting the patient support which is connectable to the pivoting unit, wherein the pivoting unit is pivotable about at least a first rotational axis and a second rotational axis, wherein the first rotational axis and the second rotational axis are perpendicular to one another when projected onto a horizontal plane, and wherein a longitudinal axis of the patient support and the first rotational axis are perpendicular to one another when projected onto a horizontal plane.

7. The operating table column according to claim 1, wherein a longitudinal axis of the first linear actuator and a longitudinal axis of the second linear actuator are spaced in a direction of a longitudinal axis of the patient support.

8. The operating table column according to claim 1, wherein the column head and an upper end of the first linear actuator are mechanically connected within the first connecting area via a first pivot bearing so as to be pivotable about a first rotational axis, the column head and an upper end of the second linear actuator are mechanically connected within the second connecting area via a second pivot bearing so as to be pivotable about a second rotational axis, and the first rotational axis and the second rotational axis are parallel.

9. The operating table column according to claim 8, wherein the first pivot bearing is mechanically connected to the second pivot bearing via the length adjustment assembly, one end of the pivoting and sliding member being insertable in the bearing member and extractable from the bearing member, for changing the distance between the first connecting area and the second connecting area during the actuating motion of the first linear actuator or the second linear actuator, and the patient support connectable to the column head, when present, is pivotable about a longitudinal axis of the pivoting and sliding member.

10. The operating table column according to claim 8, wherein the first support element is fixedly connected to the first pivot bearing and pivotable about at least the first rotational axis.

11. The operating table column according to claim 10, wherein at least one of the first linear actuator, the second linear actuator and the third linear actuator is a double-acting cylinder.

12. The operating table column according to claim 1, wherein the first support element is pivotably connected to and carries a first end of a fourth linear actuator, and a second end of the fourth linear actuator, opposite to the first end of the fourth linear actuator, is operatively connected to the patient support interface of the column head.

13. The operating table column according to claim 12, wherein a longitudinal axis of the first linear actuator and a longitudinal axis of the second linear actuator are in a vertical plane, a third connecting area for connection with the first end of the third linear actuator is located on a first side at a first distance to said vertical plane, and a fourth connecting area for connection with the first end of the fourth linear actuator is located on a second side opposite the first side at a second distance to said vertical plane, wherein the first distance and the second distance are equal.

14. The operating table column according to claim 1, wherein the column head includes a second support element pivotably linked to the second linear actuator, and the second support element is pivotably connected to a first end of a fourth linear actuator, and wherein a second end of the fourth linear actuator is connected to the column head.

15. The operating table column according to claim 1:
wherein the column head and the upper end of the first linear actuator are mechanically connected via a first pivot bearing so as to be pivotable about a first rotational axis; and
wherein the first support element is separately pivotable about both the first rotational axis, and also about an axis of the pivoting and sliding member, wherein first rotational axis and the axis of the pivoting and sliding member are not overlapping or parallel.

16. An operating table column, comprising:
a basic body;
a column head to which a patient support is connectable; and
a first linear actuator and a second linear actuator which are independently adjustable for changing a position of the column head relative to the basic body;
wherein the first linear actuator and the second linear actuator each are configured so as to perform an actuating motion in a vertical direction upon activation thereof;
wherein the column head and an upper end of the first linear actuator are mechanically connected via a first pivot bearing so as to be pivotable about a first rotational axis;
wherein the column head and an upper end of the second linear actuator are mechanically connected via a second pivot bearing so as to be pivotable about a second rotational axis;
wherein the first rotational axis and the second rotational axis are parallel;
wherein the column head includes a length adjustment assembly through which a distance between the first connecting area and the second connecting area is changeable during the actuating motion of the first linear actuator or the second linear actuator;
wherein the first linear actuator and the second linear actuator are force transmitting elements attaching the column head to the basic body;
wherein the column head is a pivotable column head;
wherein the length adjustment assembly includes a bearing bush and a pivoting and sliding pin, the pivoting and sliding pin being pivotably coupled to the second linear actuator at one end of the pivoting and sliding pin;
wherein the bearing bush is rotatable about the pivoting and sliding pin; and
wherein the bearing bush is movable along an axial direction of the pivoting and sliding pin;
wherein the first pivot bearing is engaged to the second pivot bearing via the length adjustment assembly;
wherein one end of the pivoting and sliding member is insertable in the bearing bush and extractable from the bearing bush, for changing the distance between the first pivot bearing and the second pivot bearing during the actuating motion of at least one of the first linear actuator and the second linear actuator;
wherein a first support element is pivotably linked to the first linear actuator; and
wherein a third linear actuator is linked to and carried by the first support element, the third linear actuator being connected to the first support element at a first end of the linear actuator, and operatively connected to a pivoting unit of the column head at a second end of the linear actuator.

17. An operating table column, comprising: a basic body; a column head to which a patient support is connectable; and a first linear actuator and a second linear actuator which are independently adjustable for changing a position of the column head relative to the basic body; wherein the first linear actuator and the second linear actuator each are force transmitting elements configured so as to perform an actuating motion in a vertical direction upon activation thereof; wherein the first linear actuator is mechanically connected to the column head via a first connecting area and the second linear actuator is mechanically connected to the column head via a second connecting area; wherein a first support element is pivotably linked to the first linear actuator; and wherein a third linear actuator is linked to and carried by the first support element, the third linear actuator being pivotably connected to the first support element at a first end of the linear actuator, and operatively connected to a pivoting unit of the column head at a second end of the linear actuator, the pivoting unit being connectable to the patient support when present; and wherein the column head includes a length adjustment assembly through which a distance between the first connecting area and the second connecting area is changeable during the actuating motion of the first linear actuator or the second linear actuator; and wherein the first support element is pivotably connected to and carries a first end of a fourth linear actuator, and a second end of the fourth linear actuator, opposite to the first end of the fourth linear actuator, is operatively connected to the pivoting unit.

18. The operating table column of claim 17: wherein the length adjustment assembly includes a bearing member and a pivoting and sliding member, the pivoting and sliding member being pivotably coupled to the second linear actuator at one end of the pivoting and sliding member; wherein the bearing member is both rotatable about the pivoting and sliding member and also movable along a longitudinal direction of the pivoting and sliding member.

19. The operating table column according to claim 17:
wherein the pivoting unit is pivotable about at least a first rotational axis and a second rotational axis,
wherein the first rotational axis and the second rotational axis are perpendicular to one another when projected onto a horizontal plane, and
wherein the longitudinal axis of the patient support when present, and the first rotational axis, are perpendicular to one another when projected onto a horizontal plane.

20. The operating table column according to claim 17:
wherein a longitudinal axis of the first linear actuator and a longitudinal axis of the second linear actuator are in a vertical plane,
wherein the third linear actuator is linked to the first support element at a third connecting area; and
wherein the third connecting area is spaced laterally away from said vertical plane.

21. The operating table column according to claim 17, wherein:
the column head and an upper end of the first linear actuator are mechanically connected within the first connecting area via a first pivot bearing so as to be pivotable about a first rotational axis,
the column head and an upper end of the second linear actuator are mechanically connected within the second connecting area via a second pivot bearing so as to be pivotable about a second rotational axis, and the first rotational axis and the second rotational axis are parallel.

\* \* \* \* \*